March 6, 1934.  W. O. AWA ET AL  1,949,641
FRUIT PITTING MACHINE
Filed April 29, 1930  8 Sheets-Sheet 4

INVENTORS.
William O. Awa.
Charles Klemme.
BY Baldwin Vale
ATTORNEY.

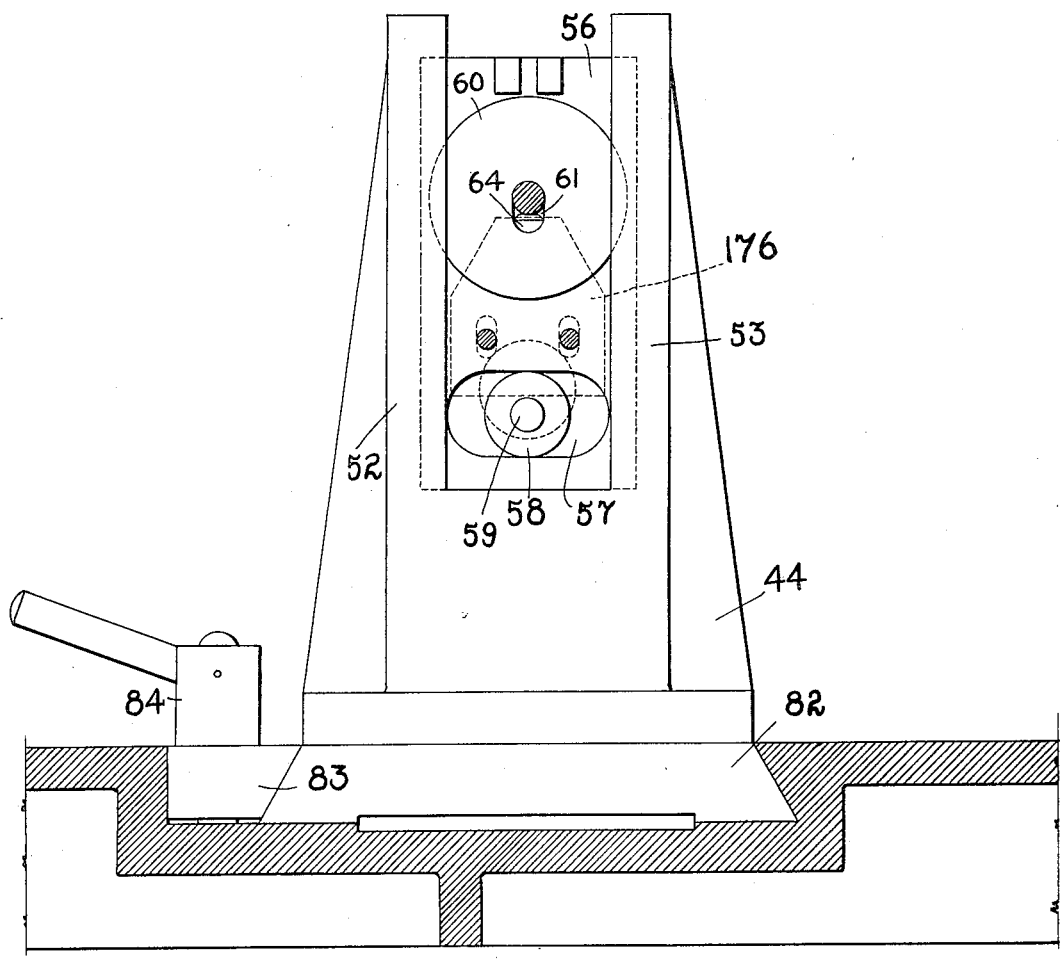

March 6, 1934.  W. O. AWA ET AL  1,949,641
FRUIT PITTING MACHINE
Filed April 29, 1930   8 Sheets-Sheet 6
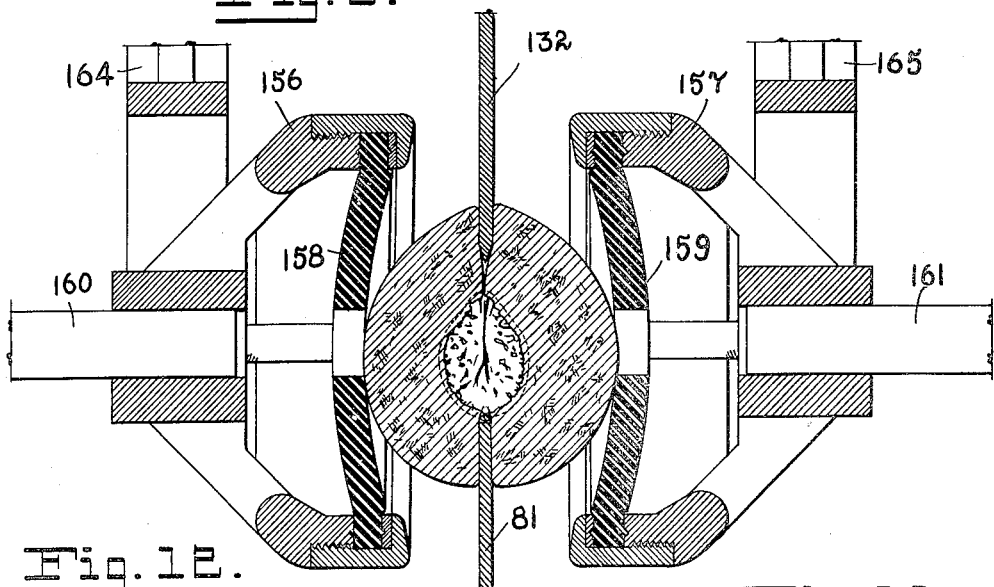
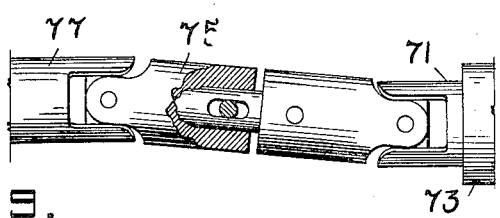
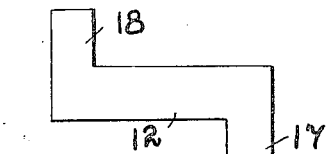
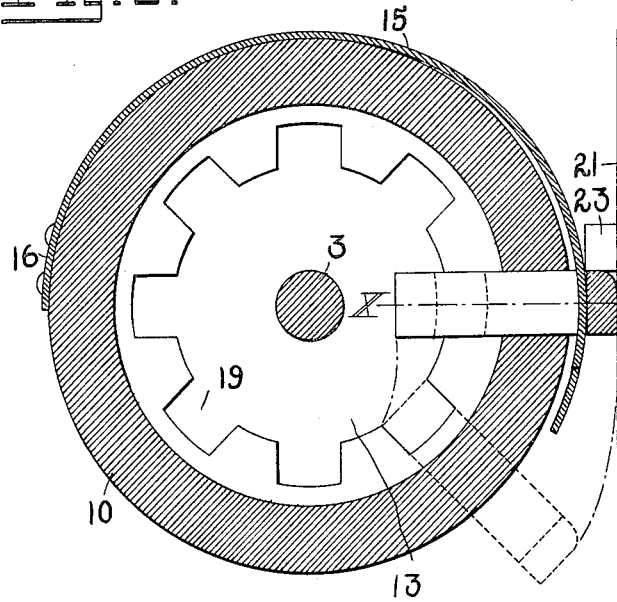
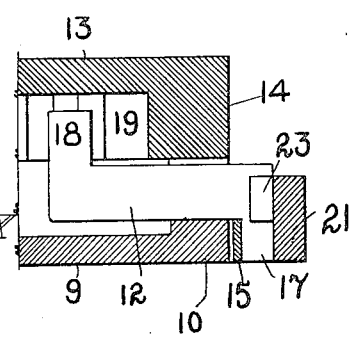
INVENTORS.
William O. Awa.
Charles Klemme.
ATTORNEY.

March 6, 1934.  W. O. AWA ET AL  1,949,641
FRUIT PITTING MACHINE
Filed April 29, 1930   8 Sheets-Sheet 7
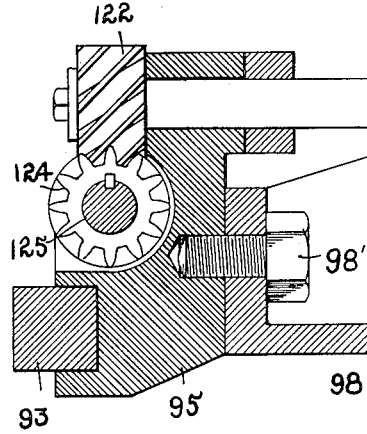
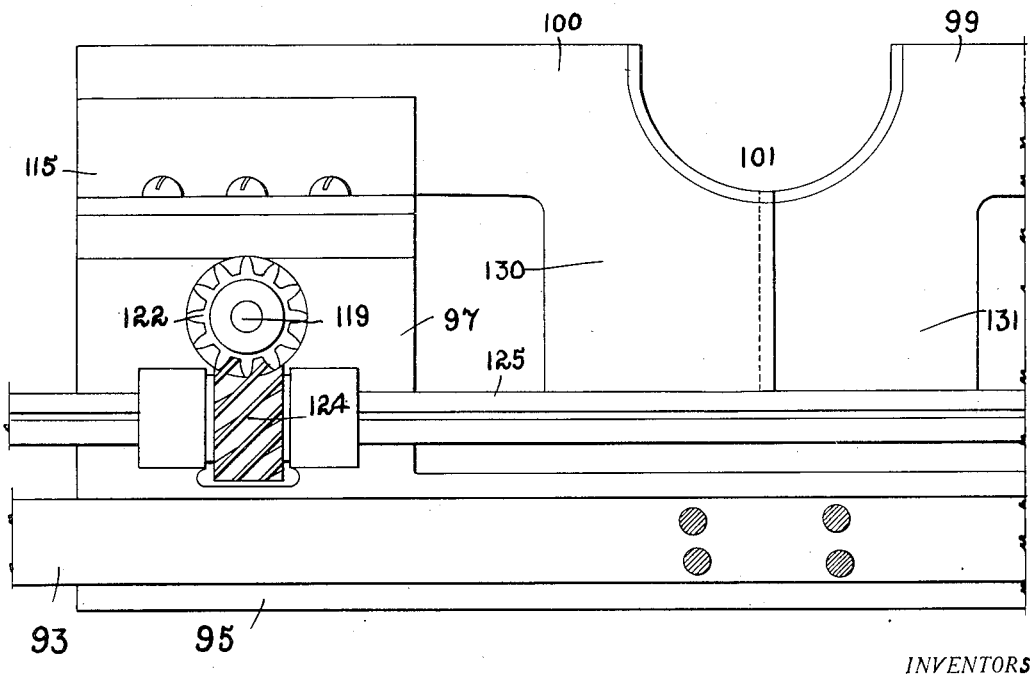
INVENTORS.
William O. Awa.
BY Charles Klemme
ATTORNEY.

March 6, 1934.  W. O. AWA ET AL  1,949,641
FRUIT PITTING MACHINE
Filed April 29, 1930   8 Sheets-Sheet 8
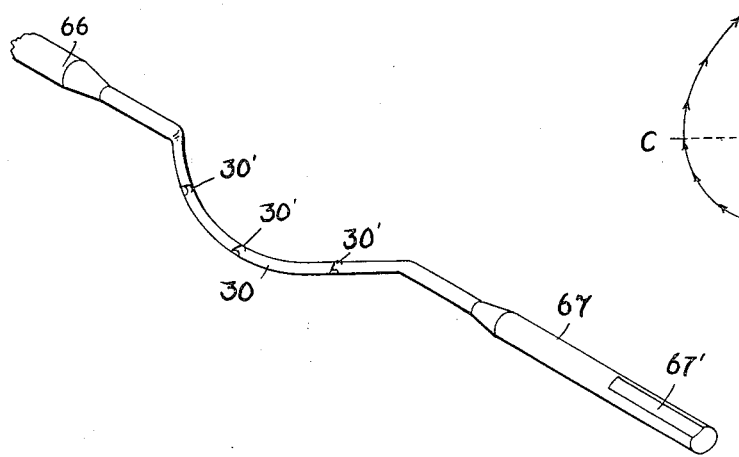
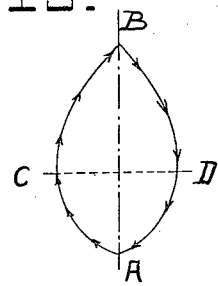
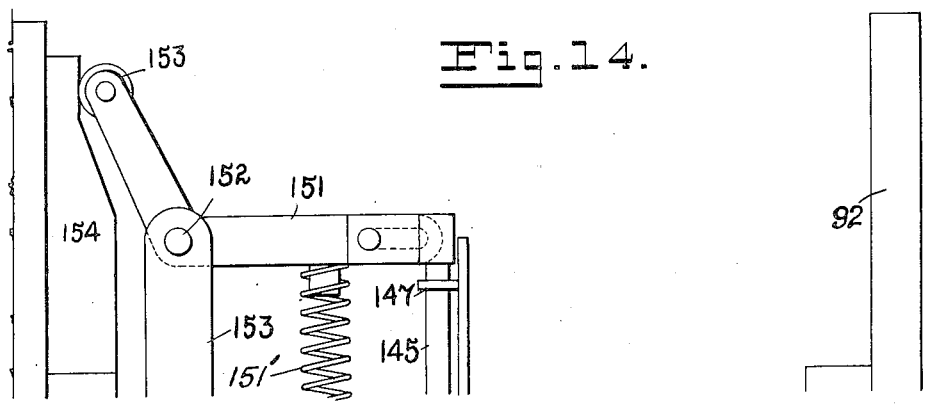
INVENTORS.
William O Awa.
BY Charles Klemme.
Baldwin Vale
ATTORNEY.

Patented Mar. 6, 1934

1,949,641

UNITED STATES PATENT OFFICE 1,949,641

FRUIT PITTING MACHINE

William O. Awa and Charles Klemme,
San Francisco, Calif.

Application April 29, 1930, Serial No. 448,366

16 Claims. (Cl. 146—28)

This invention relates to improvements in fruit pitting machines, and more particularly to means for feeding the fruit to the pitter and the means for incising the fruit and removing the pits therefrom.

The principal object is to remove the pit with the minimal waste of fruit meat.

Another object is to so shape and drive, and control, a curved blade that it will describe an orbit within a peach around the pit, guided by and parallel with the contour of the pit.

Another object is to provide a pitting unit that may be combined with various feeding means.

A further object is to automatically complete the pitting operation after the peach is selectively fed to the machine.

Other objects and advantages will appear as the description progresses.

In the specification and the annexed drawings the invention is disclosed in its preferred form. But it is to be understood that it is not limited to this form because it may be embodied in other forms. It is also to be understood that in and by the claims following the description it is desired to cover the invention in whatsoever form it may be embodied.

In the eight sheets of drawings:

Fig. 5 is an end view of the same.

Fig. 6 is a greatly enlarged detail (approximately full size) side elevation view of the peach transferring and holding clamps, taken from below the line VII—VII, Fig. 3.

Fig. 7 is a greatly enlarged detail in side elevation of the peach impaling blade of the peach receiving and horizontal feeding mechanism.

Fig. 8 is a detail in vertical section of the line VIII—VIII, Fig. 1 of the rack and pinion drive for the horizontal feeding mechanism.

Fig. 9 is a fragmentary front view in vertical section on the line IX—IX, Fig. 1, of the clutch mechanism.

Fig. 10 is a similar side view of a portion of the same taken on the line X—X, Fig. 9.

Fig. 11 is a detail side elevation of the clutch dog.

Fig. 12 is a detail in side elevation of one of the slip joints of the flexible drive for the pitter blade.

Fig. 13 is a perspective detail of the curved rotary pitting blade.

Fig. 14 is a fragmentary side elevation readable as a continuation upward of Fig. 3, showing the bell crank mechanism for severing the top of the peach.

Fig. 15 is a diagrammatic outline of a characteristic curve of the pitting operation.

The major combination of mechanisms comprises the horizontal feed mechanism for receiving the peaches manually placed therein by the operator; the vertical feed mechanism which forces the peach from the horizontal feed and forces it downward, completing the splitting of the peach and the pitting mechanism which removes the pit and divides the peach into halves.

Figure 1:
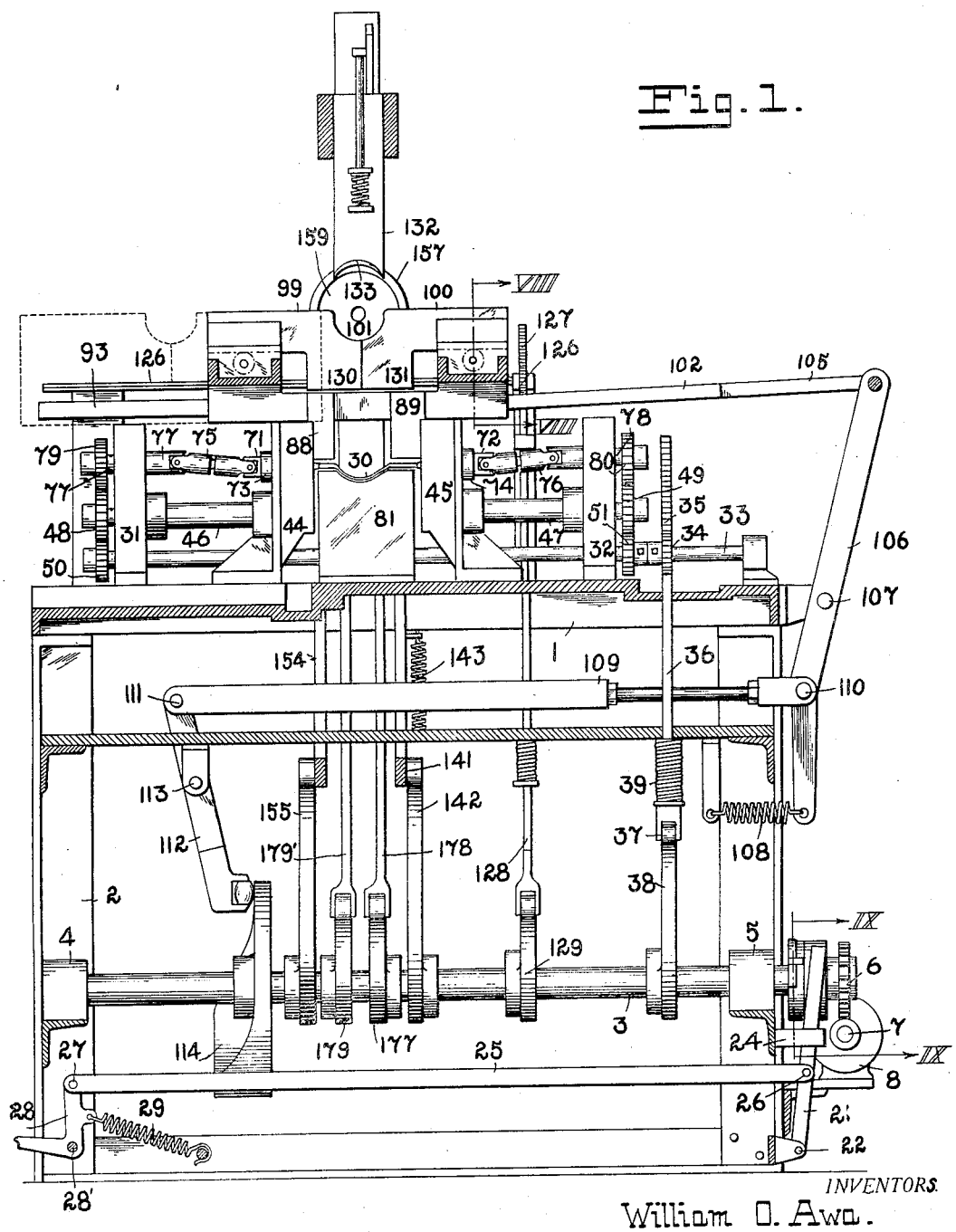
Fig. 1 is a general assembly in side elevation of a peach pitter constructed in accordance with this invention.

In detail the construction illustrated in the drawings, see Fig. 1, consists of the main frame comprising the bed 1, supported on a suitable open frame work 2, or in any other suitable manner.

The cam shaft 3 is mounted in the suitable bearings 4, 5 on the main frame. This shaft is driven by the worm gear 6 enmeshed with the gear worm 7 on the shaft of the motor 8. The cam shaft is thus driven at about 40 R. P. M.

There is a pedal clutch mechanism interposed between the cam shaft 3 and the prime mover B, see Figs. 9, 10, 11. The clutch comprises the disc 9 fixed in the end of the cam shaft 3. This disc has a peripheral flange 10 with an open notch therein to guide the substantially Z shape dog 12.

The disc 13 is free on the end of the shaft 3, and has a peripheral flange 14, bearing against the flange 10 to confine the dog in the notch in the flange 10.

The peripheral spring 15 is fixed at 16 to the flange 10 and engages under the tail 17 of the dog to normally hold the head 18 of the dog in engagement with one of the notches 19, in the flange 14 of the disc 13 free on the shaft 3 and driven by the worm gear 7, to keep the cam shaft 3 in constant revolution until declutched.

The dog 12 is withdrawn from the notch 19 by interposing the laterally moving lever 21, pivoted at 22 on the main frame, see Fig. 1. The tail 17 of the dog contacting the side of this lever, see dotted lines Fig. 9, is gradually depressed toward the axis of the shaft 3 until the head 18 disengages from the notch 19, and the tail 17 comes to a definite stop under the lug 23 fixed on the lever 21. This arrests the shaft 3 at a predetermined definite point each time it is declutched.

The bracket 24 is fixed to the main frame and extends behind the lever 21 to prevent it receding when engaged by the tail 17 of the dog.

The lever 21 is operated by the drag link 25, pivoted to the lever at 26 and at 27 to the bell crank pedal 28, see Fig. 1. This pedal is pivoted at 28' to the main frame and held in the inoperative position by the spring 29.

The cam shaft 3 continues inoperative as long as the pedal is depressed, to hold the dog 18 out of engagement with the notches 19. When the pedal is released the spring 29 throws the lever 21 back and the spring 15 throws the dog into any notch 19 and the cam shaft 3 continues to operate until the pedal is depressed, which disengages the dog, as described, but always in the same position with respect to the cam shaft 3, for reasons which will hereinafter appear.

Figure 3:
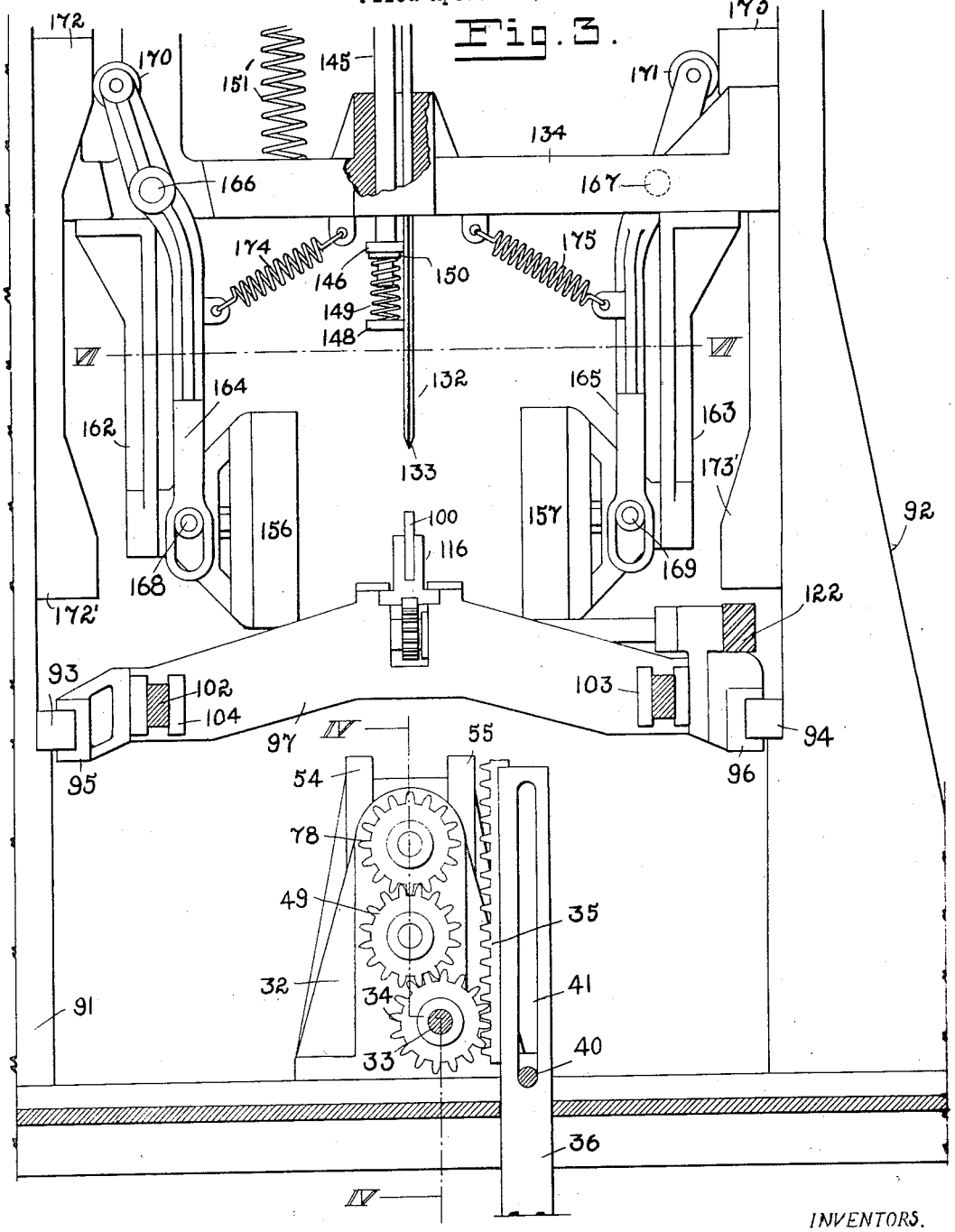
Fig. 3 is an enlarged detail end view of the same, partially in fragmentary section.
Figure 4:
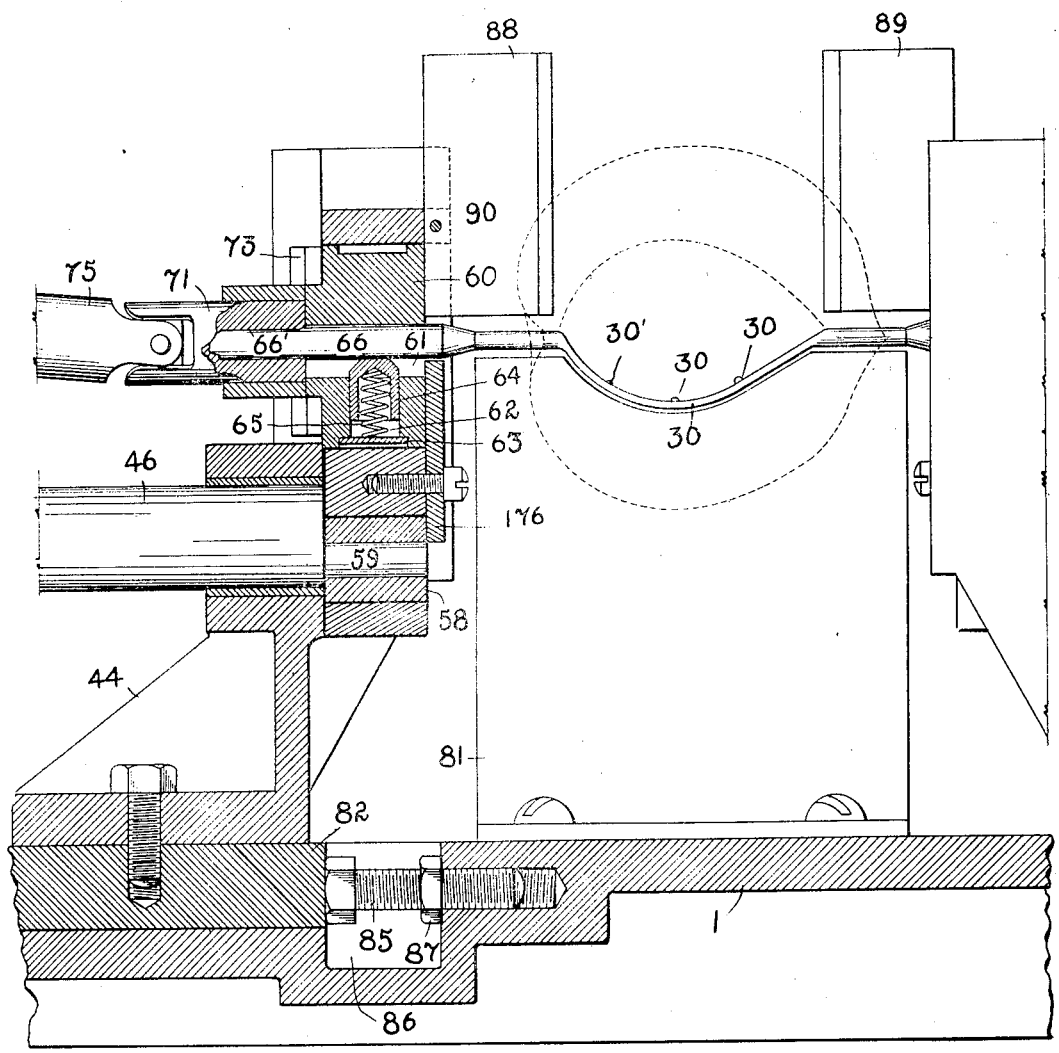
Fig. 4 is an enlarged detail side view of the pitting mechanism partially in vertical section on the line IV—IV, Fig. 3.

The major operation of pitting the peach is accomplished by the curved blade 30, see Figs. 4 and 13. The blade mechanism is assembled on the bed 1. It comprises the side standards 31, 32, fixed to the bed 1, see Figs. 1, 3, 4.

These standards have bearings therein for the drive shaft 33, which extends across the bed 1, see Fig. 1, and through these standards. It is offset with respect to the vertical centers of these standards, see Fig. 3.

The driven pinion 34 is fixed on the shaft 33 and enmeshed with the rack 35 on the push rod 36, guided in the main frame and having the roller 37 in its end resting upon the contour of the cam 38 fixed on the cam shaft 3. The expansion spring 39 encircles this rod between the main frame and the yoke of the roller 37, to normally hold the roller against the cam.

The rod 36 is guided by the pin 40 fixed on the bed 1, engaging the slot 41 in the rod. The rack 35 is fixed to the rod 36, see Fig. 3. The rack 35, and the rod 36 make one complete stroke and the cam 38, one complete revolution and reverse with each revolution of the cam shaft 3. The cam 38 has a concentric portion in its contour which causes an inactive interval in the operation of the shaft 33, to synchronize with the feeding mechanism, as will hereinafter appear.

There are two inner standards 44 and 45 in alinement with the outer brackets 31, 32, see Figs. 1, 4, both sets of which have bearings in alinement to receive the crank shafts 46 and 47 respectively. The gears 48 and 49 are fixed on the outer ends of these shafts and enmeshed with the similar gears 50 and 51 fixed on the drive shaft 33 with which they thus operate in unison, see Fig. 1.

Each of the inner standards 44, 45 are provided with vertical guides 52, 53, and 54, 55 respectively, see Fig. 5. Each of these sets of guides has a cross head such as 56, vertically slidable therein and having a transverse slot 57 engaging the antifriction roller 58 on a crank pin 59 fixed eccentrically in the ends of their respective shafts 46, 47. This assembly forms a "Scotch yoke" to reciprocate the cross heads 56 vertically when the crank shafts 46, 47 are revolved.

Each cross head 56 also has a concentric planetary block 60 therein, see Figs. 4, 5. These blocks are revoluble in the cross heads, and have a central slot 61 therethrough. Each block has a peripheral recess 62 extending into these slots and closed by a concentric plate 63 contracting in a peripheral groove in the block. The plungers 64 are slidable in these recesses and held normally extended by an expansive spring 65, within the plunger and bearing against the plate 63. The heads of these plungers bear against the shank ends 66, 67 of the pitting blade 30 extending through the slots 61.

These shank ends are flattened as at 66', 67' to engage similarly shaped holes in the ends of the clutches 71, 72, having transverse splines 73, 74, engaging grooves in the blocks 60 and forming part of the flexible universal slip joints 75, 76.

These flexible joints are fixed to their respective stub shafts 77, 78, mounted in bearings in the outer standards 31, 32. The gears 79, 80 are fixed on the ends of these stub shafts respectively, and enmeshed with the gears 48, 49, which times them with the crank shafts 46, 47, the drive shaft 33 and through the cam mechanism, with the cam shaft 3.

Each revolution of the cam shaft 3 accomplishes one complete revolution and reverse of the blade 30, so that it always comes to rest in longitudinal alinement with the top of the vertical division plate 81, fixed to the bed 1. The top edge of this plate is contoured to the curve of the blade 30 so that the down thrust of the peach pit will not distort the blade at the instant of its revolution. The division plate 81 separates the two halves of the split peach after the pit is removed.

The inner bracket 44 is fixed to a dovetail plate 82, Fig. 4, slidable in a groove in the bed 1. One edge of this groove is completed by the beveled plate 83, Fig. 5, overhanging the edge of the plate 82 and jammed by the screw 84 passing through the plate 83 and threaded in the bed 1.

The plate 82 has the adjustable stop, Fig. 4, consisting of the cap screw 85 in the recess 86 and threaded into the bed 1 and locked by the lock nut 87. The blade 30 may be removed and replaced by slacking off the screw 84 and sliding the inner standard 44 back far enough to clear the shank 66 of the blade, then inserting another blade and bringing the plate 82 back to the stop 85 and resetting the screw 84.

Each of the cross heads 56 has a slotted lug at its top to receive the vertical guide blades 88, 89 fixed therein by the cross pins 90, Fig. 4. These blades engage and split the ends of the peach and guide it downward to the blade 30.

Figure 2:
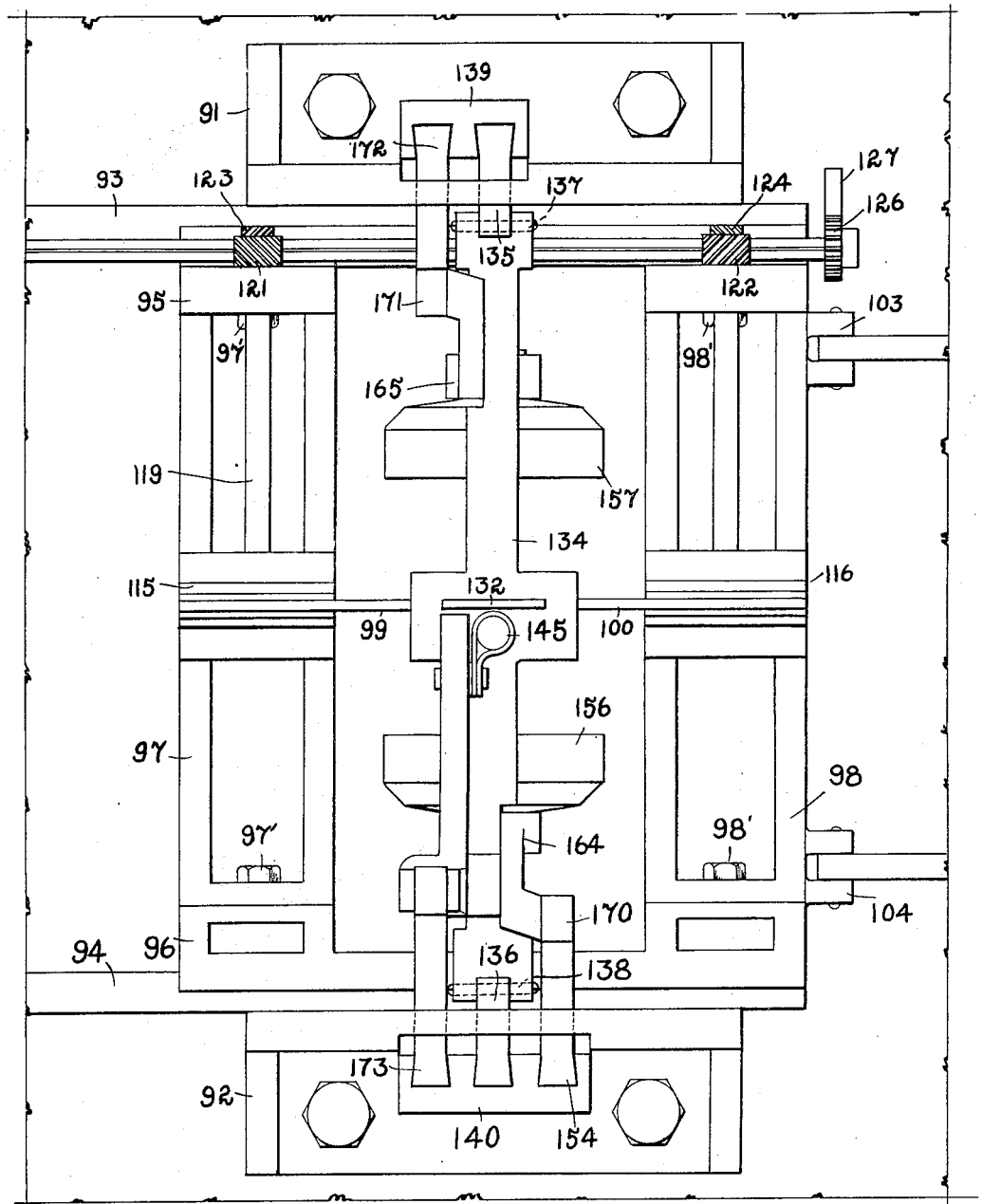
Fig. 2 is a plan view from above of the same.

The feeding and splitting mechanisms comprise a pair of supporting brackets 91, 92, fixed to the bed 1 on opposite sides of the pitting mechanism transverse to the axis of the blade 30, see Figs. 2, 3.

The guide rails 93, 94 are fixed to the inner faces of these supporting brackets and extend forward to the feeding end of the machine where the operator sits with her foot on the clutch pedal 28.

A rectangular feed carriage, see Figs. 3, 7, 8, comprising the guide shoes 95, 96 joined by the transverse beams 97, 98 is supported on the rails 93, 94. The shoes 95, 96 have slots therein engaging and slidable on these rails. The beams are bolted to the guide shoes at 97'—97' and 98'—98', respectively, see Figs. 2, 8.

Each of these beams 97, 98, is provided centrally with the retractable end and bottom slitting coacting blades 99, 100. The top edge of each blade is cut away to form a semicircular gap 101, see Figs. 1, 7, the approximate shape of the lower half of a peach pit.

The feed carriage is reciprocated forward and back, see dotted lines Fig. 1, by the yoke 102 having its opposite ends pivoted in the lugs 103, 104 on the beams 97, 98, and its stem 105 pivoted to the vertical lever 106, see Figs. 1, 2. This lever is fulcrumed at 107 on the bed 1, and held in the retracted position by the contraction of the spring 108 attached to its lower end and to the main frame. The lever 106 is operated by the adjustable drag link 109 pivoted thereto at 110. Its opposite end is pivoted at 111 to the lever 112 fulcrumed at 113 on the main frame. The lower end of this lever has an antifriction roller mounted thereon and traveling on the lateral contour of the cam 114 fixed on the cam shaft 3, the riser on the cam pushing the feed carriage forward into the dotted position to receive a peach, and retracting it to alinement with the pitting blade, see Fig. 1.

When the riser on the cam 114 pushes the feed carriage to the dotted position, Fig. 1, the operator impales a peach on the blades 99, 100, so that the peach pit rests within the gap 101, with the rib or fin of the pit vertical. This position is determined by the operator who impales the peach with the blade 99 in the characteristic crease in the surface of the peach, which is by nature alined with the fin on the pit. The blades 99, 100 sever the lower half of the peach meat, with the stem end of the pit toward the operator, and leave the peach firmly impaled on the blades when they are retracted by the contour of the cam 114 and spring 108.

The retracted carriage brings the peach pit in the gap 101 in exact vertical alinement with the blade 30 and plunger 132.

The blades 99, 100 are capable of longitudinal movement. They are fixed in the slides 115, 116 slidable in guides on their respective beams 97, 98, see Figs. 2, 8. Each slide is provided with a rack bar 117 enmeshed with pinions such as 118, on the ends of the shafts 119, 120, mounted in suitable bearings in their respective beams 97, 98.

These shafts are driven by the spiral gears 121, 122, respectively, enmeshed with the similar gears 123, 124 splined on the drive shaft 125 mounted in suitable bearings in the shoe 95. These sets of spiral gears 121—123 and 122—124 revolve the shafts 119, 120 in opposite directions so that the blades 99, 100 will be advanced and retracted with respect to each other.

This shaft 125 is driven by the pinion 126 fixed thereon, see Figs. 1, 2. This pinion is enmeshed with the rack 127 on the end of the vertical push rod 128 guided in the main frame and having a roller in the end thereof engaging the cam 129 fixed on the cam shaft 3.

The gears 123, 124 being splined on the shaft 125, slide thereon when the feed carriage moves backward and forward, the cam 129 being timed to separate the blades 99, 100 only when the carriage is retracted as in Fig. 1. During the advance to the dotted feeding position and the return to the releasing position, the blades are in closed relation. The inner ends of the blades extend downward to form the guides 130, 131 with overlapping or interlocking vertical edges, which aline vertically with the sharpened guides 88, 89, when the blades 99, 100 are retracted to release the peach impaled thereon.

The overhead vertical plunger knife 132 is in vertical and planal alinement with the guides 130—131, 88—89, and the division plate 81, and the blade 30. The lower concave edge of the plunger 132 is sharpened at 133 to sever the top half of the peach at the initiation of its downward stroke, see Figs. 1, 3.

This plunger is resiliently mounted in the overhead cross beam 134, having its opposite ends fixed to the cam push rods 135, 136 respectively, by the cross pins 137, 138, so that this overhead beam and the push rods move up and down as a unit.

These push rods are dovetailed in cross section and slide in the guides 139, 140 fixed in the side brackets 91, 92 respectively, see Fig. 2. These push rods are cross connected at the bottom by the cross bar 141 fixed to the lower ends of the push rods, see Fig. 1. A roller is mounted on the side of this cross bar and rests upon the cam 142 fixed on the cam shaft 3. The spring 143 is attached to the push rod and the main frame and contracts to pull downward against the cam 142.

The plunger knife 132 is slidably guided in a slot in the top beam 134 parallel with the push rod 145. The knife has loops 146, 147, see Figs. 3, 14, slidable on the rod 145 above the collar 150, and also has a lug 148 fixed thereto. The spring 149 expands between the lug 148 and the collar 150 fixed near the end of the push rod.

The bell-crank 151 is fulcrumed at 152 in the end of the bracket 153 extending upward from the cross beam 134. The other end of the bell-crank has the roller therein rolling on the incline cam 154 operated by the cam 155 on the shaft 3, similar to the structure 141, 142. When the rotation of the cam 142 permits the cross beam 134 to descend, the bell crank 151 is operated by the up push cam 155 to cause a sharp down push to sever the top half of the peach impaled on the blades 99, 100, as described; this severs the meat of the peach down to the pit.

The continued descent of the plunger 132 thrusting against the pit pushes it between the knives 99, 100 which separate synchronously with the descent of the plunger 132, by the operation of the right and left operation of the spiral gear sets 121—123, 122—124 and the cam 129, previously described. The guide blades 88, 89 enter the cuts in the meat of the peach made by the blades 130, 131 and the plunger 132, see Figs. 1, 4, and guide the peach downward until the blade 30 enters the original cut made by the blades 99, 100, the meat of the peach being separated on opposite sides of the division plate 81.

The plunger 132 completes its downward stroke and pushes the peach pit firmly against the blade 30. This blade is guarded against springing downward by resting within the concave top of the division plate 81; also by the resilience of the spring 149. The movement of the cam 155 permits the descent of the cam 154, see Fig. 1. (See Fig. 13.) As the cam 154 descends, the roller 153 swings laterally to lift the bell crank 151 under the expansion of the spring 151. This lifts the cutting edge 136 of the plunger 132 about ¼" above the peach pit, see Fig. 6, which permits the rotation of the cutting blade 30 to sever the pit from the peach.

To control the descent of the peach and to hold it firmly during the pitting operation, the lateral clamps 156, 157 are provided. These clamps are guarded by the soft rubber discs 158, 159 directly and resiliently engaging the opposite sides of the peach, see Figs. 1, 2, 3, 6. These clamps are slidably guided on the stems 160, 161 fixed in the brackets 162, 163 respectively, fixed to the under side of the cross beam 134, and descend in unison therewith.

These clamps are held normally out of contact with the peach during the infeeding operation of the feed carriage, by the yokes 164, 165, pivoted at 166, 167 on the cross beam 134. These yokes have slotted engagement with the trunnions 168, 169 on the opposite sides of the clamps 156, 157, see Fig. 3. The upper ends of these yokes have the rollers 170, 171, riding on their respective vertical cams 172, 173 guided in the brackets 91, 92, see Fig. 2.

Slightly in advance of the descent of the cross beam 134 these rollers descend from the cam risers 172, 173, permitting the contraction of the springs 174, 175 to draw the clamps 156, 157 snugly against the sides of the peach to hold it in its originally fed placement throughout the subsequent pitting operation.

The peach is held by the clamps firmly against lateral displacement during the operation of the blade 30. Synchronously with the arrival of the peach pit against the blade 30, the cam 38 permits the rack 35 to descend, under the expansive pressure of the spring 39, to rotate the shaft 33 of the blade operating mechanism, which, due to the previously mentioned concentric, dwell in the cam 38, has remained inactive during the operation of the horizontal and vertical feed mechanisms.

The rotation of the blade 30 from both ends, by the flexible shafts 75, 76, as described, causes the blade to completely encircle the pit within the peach, entirely severing it from the peach meat.

The particular novelty in this pitting operation is the deflection of the blade 30 from a concentric orbit of rotation. This is symmetrically accomplished by the vertical rise of the cross heads 56, see Fig. 5. The blade 30 starts from the vertical chord line A at the top of the division plate 81, swings simultaneously outward and upward, then converges inward and crosses the chord line at B and descends downward and inward and comes to rest on top of the division plate 81 at the point of commencement A, see Fig. 15.

The resultant geometrical orbit is almost exactly the contour of the cross section of the average peach pit. In fact this is so exactly true that provision is made for not cutting too close to the pit. The canning industry objects to the presence of the peach meat directly in contact with the pit because it discolors the peach meat and carries an acrid flavor. Because of this, the blade 30 is provided, on its inner face adjacent the cutting edge, with the guard beads or bosses 30' to ride on the surface of the pit and spring the blade edge outward therefrom a distance equal to the heights of the guards 30'.

The width of the cut of the blade C—D is determined by the curvature of the blade from the axis of the shanks 66, 67. The height or length of the cut is determined by the stroke of the crank pins 59, determining the rise of the cross heads 56.

There is an occasional pit which is asymmetrical, deformed, or perhaps nearly round in cross section, which may deflect or unduly flex the blade 30. The plates 176 are adjustably screwed to the faces of the cross heads 56 and act as stops to keep the blade 30 slightly above the top edge of the division plate 81, when the blade is alined therewith at the initiation and completion of its revolution.

The plungers 64 resiliently bearing against the shanks 66, 67 of the blade, permits the lateral displacement of the blade as a whole within the limits of the slots 61 throughout the cycle of revolution of the blade 30, except when stopped by the plates 176 as described. This acts as a safety measure to save breakage of the blade should a split pit or other unusual obstruction be met within the peach.

Synchronously with the completion of the cycle of the blade 30, the cam 177 fixed on the shaft 3, lifts the push rod 178, to which the vertical cam 172 is fixed, see Figs. 2, 3, lifting it until the riser 172' pulls the clamp 156 away from the side of the peach permitting that half of the peach to drop into a receptacle or onto a draper for removal. Synchronously with the backing off of the clamp 156, the blade 30, kicks out the peach pit, clear of the machine. Then the cam 179 on the shaft 3, lifts the push rod 179' and the cam 173' and backs away the clamp 157, permitting the other half of the peach to descend on the opposite side of the division plate 81, and the operation is complete.

All the operations are driven from a single source and synchronized by the cam shaft 3. If the clutch mechanism is released, the whole mechanism stops on a predetermined center, to at all times maintain definite timing.

The curvature of the blade 30 may be varied to meet variations in the several types or species of peach pits, a longer blade for the larger pits and a shorter blade for the smaller pits. Only two or three sizes of peaches are canned or dried. The other varieties are consumed fresh or are of the free stone varieties. Suitable blades are easily and quickly substituted, and dull blades replaced, as described.

For obvious mechanical reasons the curved pitting blade 30 is driven from both ends. The blade drive and cross head deflecting mechanisms are duplicated at both ends of the blade, but one set may be omitted without changing the mode of operation of the blade.

There are available steel alloys strong enough to withstand the one end drive if the shank were omitted from the other end of the pitting blade.

The fruit feeding, transferring and clamping mechanisms are suitable combinative mechanisms with the pitting unit but variations therein within the purview of this invention will be manifest to those skilled in the art.

Having thus described this invention what is claimed and desired to secure by Letters Patent is:

1. In a fruit pitting machine having a rotary curved blade; flexible means for driving said blade; planetary blocks surrounding the axis of said blade and engaging said driving means; resilient means between said blade and planetary blocks; and means for moving said blocks.

2. In a fruit pitting machine having a rotary curved blade; flexible means for driving said blade; planetary blocks having slots therein surrounding said blade; resilient plungers in said slots bearing against said blade; cross heads engaging said blocks; and means for moving said cross heads.

3. In a fruit pitting machine having a rotary curved blade; flexible means for driving said blade; planetary blocks driven in unison with said blade; cross heads engaging said blocks and having transverse slots therein; crank pins engaging said slots and driven in unison with said driving means; and resilient means interposed between said blocks and blade.

4. In a fruit pitting machine having a rotary curved blade; flexible driving means engaging both ends of said blade; cross heads engaging both ends of said blade and driven in unison with said blade; planetary blocks interposed between said cross heads and the ends of said blade and driven in unison with said blade; and resilient means interposed between said blocks and blade ends.

5. A fruit pitting machine having a rotary curved blade; flexible means for rotating said blade; means for moving said blade axially during rotation; a division plate beneath said blade; guide blades alined with said plate; feed means for severing the fruit surrounding the pit thereof, and forcing the severed fruit between the guide blades until said pit rests upon the rotary blade; clamps adapted to engage said fruit, and means for moving said clamps synchronously with the operation of said feeding, severing and blade rotating means.

6. In a fruit pitting machine having a rotary curved blade; means for moving said blade axially during its rotation; a feeding mechanism comprising a pair of separable blades movable into and out of alinement with said blade; means for moving and separating said pair of blades in synchronism with the operation of said rotary blade; a reciprocating plunger operated in synchronism with the separation of said blades; guide blades beneath said separable blades on opposite sides of said plunger, and clamps on opposite sides of said plunger and movable synchronously therewith.

7. A fruit pitting machine having a rotary curved blade; means for moving said blade axially during its rotation; a feeding mechanism comprising a pair of separable blades movable into and out of alinement with said blade; means for moving and separating said pair of blades in synchronism with the operation of said rotary blade; a reciprocating plunger operated in synchronism with the separation of said blades; guide blades beneath said separable blades on opposite sides of said plunger, and means for retracting said plunger slightly during the operation of said blade.

8. A fruit pitting machine comprising a main frame; a cam shaft and motive means mounted on said frame; a clutch interposed between said motive means and cam shaft; a pitting mechanism mounted upon said frame and operated by a cam on said cam shaft; a horizontal feed mechanism operated by a cam on said cam shaft, and a vertical feed mechanism operated by a cam on said cam shaft cooperating with said pitting mechanism and horizontal feed mechanism, all so combined and arranged that the operations of said pitting and feeding mechanisms are synchronized by said cam shaft.

9. A fruit pitting machine comprising a main frame, a cam shaft and motive means mounted on said frame; a pitting mechanism comprising a pair of opposed side standards on said frame; a drive shaft mounted on said standards; driving means between said driving shaft and said cam shaft; a pair of crank shafts mounted in said pair of standards respectively and geared to said drive shaft; a pair of cross heads engaging said crank shafts; flexible driving means mounted in said pair of standards respectively and geared to said drive shaft; a curved blade engaging said flexible driving means; and means engaging said crank shafts for moving the axis of said blade during its rotation.

10. A fruit pitting machine comprising a main frame, a driven shaft on said frame; a pitting mechanism comprising a support mounted on said frame, a cross head movable in said support; a planetary block movable in said head; a blade driving means controlled by said block; a curved blade engaging said blade driving means; and operative means between said cross head, planetary block and blade driving means and said driven shaft.

11. A fruit pitting machine, comprising a main frame, a driven shaft on said frame; a pitting mechanism comprising a support on said frame; a cross head guided on said support; a crank shaft mounted in said support and engaging said cross head; a planetary block in said cross head; a flexible drive engaging said block; a curved blade fixed to said flexible drive and resiliently engaging said block; means for mechanically holding fruit in relation to said blade; and means for operating the above combination of mechanisms in synchronism by said driven shaft.

12. A fruit pitting machine comprising a main frame; a driven shaft on said frame; a rotary curved blade; a division plate beneath said blade, flexible means for rotating said blade; means for moving said blade axially during rotation; feed means for severing the fruit surrounding the pit thereof and forcing the severed fruit into position with the pit resting upon said curved blade and with the pit gripped between said feed means and division plate; clamps adapted to hold said fruit during the feeding and pitting operation; and intermediate synchronizing means between said feeding, pitting and clamping mechanisms and said driven shaft.

13. A fruit pitting machine comprising a main frame; a driven shaft on said frame; a rotary curved blade; flexible drive means for said blade; means for moving said blade axially during its rotation; a horizontal feed comprising a pair of opposed blades adapted to impale the fruit and sever it to the pit on one side; means for separating said blades; a vertical feed adapted to sever said fruit to the pit and force the pit into contact with said rotary blade; clamps adapted to hold said fruit during the vertical feeding and pitting operations, and intermediate operating and synchronizing means between said flexible drive, blade moving, horizontal and vertical feed, blade separating and clamp mechanisms and said driven shaft.

14. A fruit pitting machine comprising a main frame; a driven shaft on said frame; an intermittently rotatable pitting blade; a slidable feed carriage geared to said shaft; opposed blades slidable on said carriage; means for separating said blades synchronously with the movement of said carriage; means for transferring fruit from said opposed blades to said pitting blade synchronously with the separation of said blades and the rotation of said pitting blade; and means for holding the fruit during the pitting operation.

15. In a fruit pitting machine; rotary planetary blocks; a curved pitting blade having its ends mounted in said blocks; a radial spring in each of said blocks expanding against the ends of said blade; and means for driving said blocks and blade.

16. In a fruit pitting machine; a rotary curved blade having a lateral shank; mounting means for said shank; resilient means interposed between said mounting and said shank; and means for driving said blade.

WILLIAM O. AWA.
CHARLES KLEMME.